United States Patent
Costard

(10) Patent No.: US 8,784,503 B2
(45) Date of Patent: Jul. 22, 2014

(54) HIGH-STRENGTH FIBROUS MATERIAL CONSISTING OF NATURAL FIBRES, METHOD FOR THE PRODUCTION THEREOF, AND USE OF SAME FOR PRODUCING COMPOSITE MATERIALS

(75) Inventor: Herbert Costard, Neu Wulmstorf (DE)

(73) Assignee: Flasin Faser GmbH, Neu Wulmstorf (DE)

( * ) Notice: Subject to any disclaimer, the term of this patent is extended or adjusted under 35 U.S.C. 154(b) by 689 days.

(21) Appl. No.: 12/665,333

(22) PCT Filed: Jun. 23, 2008

(86) PCT No.: PCT/EP2008/005060
§ 371 (c)(1),
(2), (4) Date: Feb. 10, 2010

(87) PCT Pub. No.: WO2009/003606
PCT Pub. Date: Jan. 8, 2009

(65) Prior Publication Data
US 2010/0176354 A1    Jul. 15, 2010

(30) Foreign Application Priority Data
Jul. 2, 2007    (DE) .......................... 10 2007 030 576

(51) Int. Cl.
| D06L 3/00 | (2006.01) |
| D06L 3/04 | (2006.01) |
| D06L 3/06 | (2006.01) |
| D06L 3/10 | (2006.01) |
| D06L 3/14 | (2006.01) |
| D06L 3/16 | (2006.01) |
| D06M 11/34 | (2006.01) |
| D06M 11/38 | (2006.01) |
| D06M 11/40 | (2006.01) |
| D06M 11/09 | (2006.01) |
| D06M 11/11 | (2006.01) |

(52) U.S. Cl.
USPC ............. 8/116.1; 8/101; 8/107; 8/109; 8/111; 8/115.51; 8/115.6

(58) Field of Classification Search
USPC ............. 8/115.51, 116.1, 101, 107, 109, 111, 8/115.6
See application file for complete search history.

(56) References Cited

U.S. PATENT DOCUMENTS

| 2,061,616 A * | 11/1936 | Dreyfus .......................... 162/90 |
| 4,141,786 A * | 2/1979 | Eckert ............................. 162/40 |
| 6,036,616 A * | 3/2000 | McCarrick et al. ............ 475/214 |
| 2006/0014080 A1 * | 1/2006 | Kubo et al. ................... 429/255 |

FOREIGN PATENT DOCUMENTS

| DE | 3221096 | * 12/1983 |
| DE | 3221096 A1 | 12/1983 |
| EP | 0378800 A | 7/1990 |

OTHER PUBLICATIONS

International Search Report.
International Preliminary Report on Patentability.

* cited by examiner

Primary Examiner — Lorna M Douyon
Assistant Examiner — Amina Khan
(74) Attorney, Agent, or Firm — Jeffrey S. Melcher; Manelli Selter PLLC

(57) ABSTRACT

The invention relates to a high-strength and abrasion-resistant fibrous material and to a method for the production thereof. According to said method, a natural fiber material is solubilized in an alkaline manner. The fibrous material is treated with an alkaline material, without being subjected to mechanical stress a) at a temperature of between 5 and 30° C. and then b) at a temperature of between 80 and 150° C., and is then optionally washed and/or dried.

34 Claims, No Drawings

HIGH-STRENGTH FIBROUS MATERIAL CONSISTING OF NATURAL FIBRES, METHOD FOR THE PRODUCTION THEREOF, AND USE OF SAME FOR PRODUCING COMPOSITE MATERIALS

This application claims priority to and is a National Phase of PCT/EP2008/005060, filed 23 Jun. 2008, and also claims priority to German Patent Application DE 10 2007 030 576.3, filed 2 Jul. 2007.

The invention relates to high-strength fibrous materials which can be produced from natural vegetable fibres. It also relates to a method for the production of these high-strength fibrous materials and use of same for producing composite materials.

In particular the invention relates to a chemical solubilization method in which the natural fibres are exposed to the action of alkalis.

Conventionally, alkaline solubilization methods are today frequently applied using caustic soda solution. These include kier boiling (boiling off), kier boiling and bleaching, mercerization, slack mercerization and bucking (cf. M. Peter and H. K. Rouette, Grundlagen der Textilveredlung, 1989, Deutscher Fachverlag Gmbh, Frankfurt am Main).

With the methods of alkaline kier boiling and bleaching (NaOH and for example $H_2O_2$ as bleaching agents) frequently applied today the strength and abrasion values of the raw fibres are reduced. This is true in particular for seed and bast fibres, in particular cellulose fibres, such as for example linters fibres, cotton fibres and bast fibres, in particular sclerenchyma fibres. The kier boiling and bleaching temperature are usually in the range from 110 to 140° C.

Methods in which enzymes are used as a rule to eliminate the vegetable accompanying substances such as for example the pectins occupy a special position.

Another method using trisodium phosphate in combination with a Borax pre-treatment is described in EP 0 861 347 B1. This method permits a gentle solubilization or a gentle bleaching. A restructuring of the fibrils as in the mercerization process described below does not, however, take place here.

An improvement in the strength and other properties of the fibres is achieved by the methods of mercerization, slack mercerization and bucking. With all three methods, a conversion of cellulose fibres into a so-called "cellulose II" takes place which is achieved by using highly-concentrated caustic soda solution baths 28 to 32° Be' (270 to 330 g/l NaOH) in the range from 10 to 20° C. over several hours.

By cellulose II is meant a fibre in which the fibrils are permanently aligned towards the fibre axis, wherein however the washing and the drying of the fibres has had thus far to take place under mechanical stress. Because of the achieved connection force of the fibrils in the parallel position compelled by the yield stress, high-strength fibres form. The obtained fibres are also characterized by gloss and good dyeing properties.

Ammonia methods occupy a special position in mercerization, i.a. the English Prograde method from the Coats company. A The fibres are pre-treated with liquid ammonia. The degree of mercerization with these methods is limited, however.

With all known mercerization methods a separate, preceding or subsequent bleaching must take place if bleach is desired for later application.

The object forming the basis of the invention is to improve the known fibre solubilization methods by providing a profitable and environmentally friendly method wherein the produced fibrous material is to satisfy high mechanical requirements.

This object is achieved according to the invention by a method for the production of a fibrous material in which a natural fibre material is solubilized in an alkaline manner and which is characterized in that the natural fibre material is treated with an alkaline material, without being subjected to mechanical stress a) at a temperature of between 5 and 30° C. and then b) at a temperature of between 80 and 150° C., and is then optionally washed and/or dried.

The fibrous material according to the invention is characterized by high strength and low abrasion.

The fibrous material according to the invention can also be used for producing composite materials, which it then endows with its advantageous properties.

Preferred embodiments are the subject of the dependent claims.

The natural fibrous starting material used according to the invention is preferably selected from a) seed fibres, in particular linters, cotton, kapok and poplar down, b) bast fibres, in particular sclerenchyma fibres, bamboo fibres, (stinging) nettles, hemp, jute, linen or flax, and ramie, c) hard fibres, in particular sisal, kenaf and manila, d) coir, and e) grasses. Preferred natural fibres are cellulose fibres, in particular linters, cotton, bast fibres and sclerenchyma fibres, preferably flax or linen, hemp, nettles, ramie, kenaf and jute, wherein flax or linen or hemp are particularly preferred.

The natural fibres used according to the invention are cellulose vegetable fibres which after alkaline treatment are characterized by excellent strength and excellent abrasion resistance.

By cellulose vegetable fibres are meant here in particular fibres which are used predominantly in the textile industry for clothing, sanitary and medical items, as yarns, woven fabrics, knitted fabrics, interlaid scrims or nonwovens, and latterly also in the production of natural fibre composites. These include i.a. linters, cotton, bast fibres and sclerenchyma fibres of any type, such as flax or linen, hemp, nettles, ramie, kenaf, jute and others.

The special and costly mercerization methods named in the introduction are conventionally applied almost exclusively to cotton. But for example with flax or linen no substantial conversion into a cellulose II form has yet been achieved. Additionally, the known methods are very cost-intensive and thus suitable only for special applications.

According to the invention a cost-favourable and environmentally friendly method (an alkaline cold-hot method) of fibre solubilization in water was thus developed which makes it possible to obtain of high-strength fibrous materials, including flax or linen, with a fibre structure identical or similar to cellulose II. The obtained fibrous materials have high strength.

The fibrous material according to the invention also has in particular a high degree of purity, a high degree of whiteness, a good dyability, a good bonding to the polymer in composite materials, a reduced swelling and water absorption above all in composite materials, for application in textiles high gloss, pleasing wearing properties in textile application (soft, pliant fibres), and/or a good spinnability in all customary spinning processes, such as for example OE methods, ring spinning methods in long- and short-staple and wet-spinning methods.

The alkaline materials used are in particular alkali metal hydroxide, in particular sodium hydroxide or potassium hydroxide, alkali metal carbonates, in particular sodium carbonate or potassium carbonate, or alkali metal phosphates, in particular trisodium phosphate or tripotassium phosphate, wherein sodium hydroxide or caustic sodium hydroxide solution, respectively, and trisodium phosphate are preferred. When using in particular trisodium phosphate the often high earth-alkali proportion, as in pectins in or at the vegetable fibres, dissolves.

The fibre swelling and thus the alignment of the fibrils in the direction of the fibre axis was shown to take place preferably at a pH of approximately 8 to 14, preferably 10 to 14, more preferably 11 to 12 in the cold process (step a)) and preferably at a temperature of between 10 and 30° C., preferably between 10 and 25° C., in particular between 15 and 25° C., more preferably between 15 and 20° C.

The cold treatment according to step a) takes place preferably over a period of 10 minutes to 3 hours, in particular 15 minutes to 2 hours and preferably 30 minutes to 1 hour.

The hot treatment used according to step b) of the natural fibre material also takes place preferably at a pH of 8 to 14, preferably 10 to 14, more preferably 11 to 12, and preferably at a temperature of between 80 and 140° C., preferably between and 140° C., in particular between 90 and 135° C., more preferably between 100 and 135° C.

The hot treatment according to step b) takes place preferably over a period of 20 minutes to 1.5 hours, in particular 30 minutes to 1 hour and preferably 45 minutes to 1 hour.

The concentration of alkaline material in water in steps a) and/or b) is, based on the active ingredient (typically a solid), preferably in the range from 5 to 15 g/l, in particular 7 to 13 g/l, preferably 8 to 12 g/l, particularly preferably at about 10 g/l.

The swelling process and thus the fibril alignment to the fibre axis according to step a) is thus fixed according to the invention by a subsequent alkaline hot treatment as kier boiling and/or bleaching according to step b).

The alkaline treatment according to the invention can be supported by adding excipients. Dispersants, complexers, sequestering agents and/or surfactants are suitable here. Water glass and foam suppressors can likewise optionally be used depending on the end-application. Other customary excipients can also be used. The addition of a complexer, dispersant and/or surfactant to the baths can accelerate and intensify the wetting of the fibres. The materials customarily used for these respective purposes in fibre treatment are suitable here.

A surfactant-free complexer in particular, for example, is suitable as complexer. A commercial product of this type is Securon® 540 from Cognis. In addition to anionic and cationic surfactants, for example in particular also a non-ionic surfactant such as an alkyl polyalkyleneglycol ether is suitable as surfactant. A commercial product of this type is Foryl® JA from Cognis. A further suitable excipient is for example also a deaeration and wetting agent, e.g. based on a phosphorous compound. A commercial product of this type is Arbyl® SFR from Cognis.

The complexers, dispersants and/or surfactant and/or deaeration agents are used, if employed, relative to active ingredient in the respective treatment bath, preferably in a concentration of respectively 0.1 to 10 g/l, in particular 0.5 to 5 g/l, more preferably 0.5 to 3 g/l.

The further conventional excipients which can be used are applied in their respective customary concentrations.

After the combined cold-hot solubilization the fibrous material is rinsed, optionally also repeatedly, with water. Depending on the type of application the rinsing process must satisfy particular requirements. Highest are the requirements applies to medical products such as medical cotton wool for example relating to residue foam formation and pH. In this regard, reference is made to the German Pharmacopoeia (DAB), e.g. 1992 edition. The rinsing can be a multi-stage process in which the individual steps can also be repeated.

The residual moisture can also be set through an optional drying.

The thus-obtained fibrous material according to the invention shows the same properties as fibres after a treatment according to one of the mercerization methods described at the outset, with the special feature that the fibres need not be kept stretched during the rinsing and/or drying in order to obtain or to create the stretched fibril structure and thus the fibre strength and the gloss of the fibres.

The fibrous material according to the invention contains a high proportion of OH groups on the surface which promote the adhesion of the fibres to one another, in particular in the case of composite materials convey the adhesion of the fibres to the further component(s) (fibre-matrix adhesion), make possible the production of semi-finished fibres for composite materials without binders and improve dye bonding in textile colouring processes.

Furthermore the fibrous material according to the invention is characterized by softness and good dyeability.

With composite materials have been produced using fibrous material according to the invention, the swelling and water absorption is reduced and a polymer, used for example as a component of the composite material, can enter the structure of the fibres. Such composite materials can also contain flame-proofing agents and further customary additives.

The strength values (elastic modulus) are for example in the case of the linen treated according to the invention approximately 60% higher than those of a linen treated according to the method according to EP 0 861 347 B1.

The elastic modulus is determined in $N/mm^2$ according to the method DIN EN ISO 5079, wherein the individual fibres are sandwiched between two cover films which serve to hold the fibres in the measuring equipment. As measuring equipment, the Diastron was used with an ALS 1260 platform and an FDAS 765 laser scanner.

Abrasion is determined according to the Martindale method DIN/EN/ISO 12947-2.

Other and additional effects result in particular during the kier boiling and bleaching of cotton.

The negative pilling formation (pilling resistance determined according to DIN/EN/ISO 12947-2) is largely avoided and to use dope brightening in order to preserve the spinnability of cotton fibres it is not necessary. The fibre properties have thus not changed negatively in respect of spinning resistance.

The fibrous material according to the invention advantageously has in particular an average strength (elastic modulus) of 1 000 to 60 000 $N/mm^2$, in particular 5 000 to 60 000, preferably 5 000 to 50 000, more preferably 7 000 to 40 000, even more preferably 8 000 to 20 000 and specially 8 000 to 15 000 $N/mm^2$.

The fibrous material according to the invention is in particular characterized in that it has an abrasion I (pilling), measured according to DIN/EN/ISO 12947-2, of 4 to 8, in particular 4 to 6, preferably 4 to 5, and/or an abrasion II (wear), measured according to DIN/EN/ISO 12947-2, of 4 to 8, in particular 4 to 6, preferably 4 to 5. These values are achieved when applying 60,000 abrasion cycles.

The method according to the invention is suitable in particular for all bast and sclerenchyma fibres and for seed or blood fibres such as cotton.

If it should be desired or necessary on the basis of the intended end-application bleaching can optionally take place at the same time as the alkaline solubilizing. Because of the improved process economics a time and cost advantage is thereby actually possible in an advantageous manner. $H_2O_2$, e.g. in the form of a 35% or 50% aqueous solution, is suitable in particular as bleaching agent. However, other bleaching agents customarily used for fibre bleaching, e.g. chlorine or ozone bleaching, are also suitable.

The bleaching agent, e.g. a hydrogen peroxide solution, is added to the treatment bath, if present, preferably in a quantity of 0.1 to 15 g/l, in particular 1 to 10 g/l and preferably 5 to 10 g/l. The quantitative are relative in this case, to 50% hydrogen peroxide solution.

The natural fibres can, according to the invention, be used in particular as flock, combed top, nonwovens or the like, but also as yarns or woven fabrics.

Preferably, the fibrous material can be used for industrial technical purposes, such as in composite materials, but also for textile, sanitary and medical purposes.

The invention is explained in more detail using the following Examples.

The examples are carried out on a bleaching apparatus LFA XD from Thies GmbH & Co KG, Coesfeld.

EXAMPLE 1

Bleach linen combed tops - caustic soda solution method
Packing density 250 g/l

1. Pack cold and wet at 20° C.
2. 60 minutes cold, NaOH 10 g/l 100%,
   Securon 540 complexer 1.5 g/l,
3. Drain without rinsing
4. Start bleaching at 45° C., 30 minutes at 110° C.,
   NaOH 10 g/l 100%,
   Securon 540 complexer 1.5 g/l,
   Hydrogen peroxide 9 g/l 50%,
   Stabilol HN stabilizer 1.0 g/l,
5. Drain without rinsing
6. Repeat step 4.
7. Drain and warm-rinse 2x at 50° C.
8. Drain and cold-rinse 2x at 18° C.
9. Drain and squeeze
10. Dry on screen belt dryer at 130° C. to 14% residual moisture Average fibre strength elastic modulus 12487 N/mm²
Whiteness ISO 88, according to DIN EN ISO 2470

A comparison product produced according to the method of Example 1 of EP 0 861 347 B1 had an average fibre strength elastic modulus of 7730 N/mm².

EXAMPLE 2

Bleaching linen flock - trisodium phosphate method $Na_3PO_4$
Packing density 350 g/l 1. Pack cold and wet at 20° C.
2. 60 minutes cold, $Na_3PO_4$ 8 g/l,
   Securon 540 complexer 1.5 g/l,
2. Drain without rinsing,
3. Start kier biling at 45° C., 30 minutes at 110° C.,
   $Na_3PO_4$ 8 g/l,
   Securon 540 complexer 1.5 g/l,
4. Drain without rinsing,
5. Start bleaching 45° C., 30 minutes at 110° C.,
   $Na_3PO_4$ 8 g/l,
   Securon 540 complexer 1.5 g/l,
   Hydrogen peroxide 9 g/l 50%,
   Stabilol HN stabilizer 1.0 g/l,
7. Drain and warm-rinse 2x at 50° C.
8. Drain and cold-rinse 2x at 18° C.

Bleaching linen flock - trisodium phosphate method $Na_3PO_4$
Packing density 350 g/l 9. Drain and squeeze
10. Dry on screen belt dryer at 130° C. to 12% residual moisture Fibre strength elastic modulus 12597 N/mm²
Whiteness ISO 80, according to DIN EN ISO 2470

EXAMPLE 3

Bleaching cotton noils - medical cotton wool
Packing density 300 g/l

1. Pack cold and wet at 30° C.
2. 40 minutes cold at 30° C., NaOH 5.5 ml/l 33%,
   Securon 540 complexer 1.0 g/l,
   Arbyl SFR deaeration agent 1.2 g/l,
   Foryl JA surfactant 0.8 g/l,
3. Heat to 110° C.,
4. Bleach for 30 minutes at 110° C.,
   Hydrogen peroxide 9 g/l 50%,
   Stabilol HN stabilizer 1.0 g/l,
5. Drain
6. Rinse at 80° C., 10 minutes,
   Securon 540 complexer 1.0 g/l,
7. Repeat steps 5 and 6.
8. Drain
9. Rinse at 50° C.
10. Repeat steps 8 and 9,
11. Drain
12. Rinse at 40° C.
    0.2 ml/l formic acid 85%
13. Drain
14. Rinse at 30° C.
15. Drain and squeeze
10. Dry on screen belt dryer at 130° C. to 12% residual moisture Whiteness ISO 92, according to DIN EN ISO 2470

EXAMPLE 4

Kier boil linen flock - trisodium phosphate method $Na_3PO_4$
Packing density 350 g/l 1. Pack cold and wet at 20° C.
2. 60 Minutes cold, $Na_3PO_4$ 8 g/l,
   Securon 540 surfactant 1.5 g/l,
3. Drain without rinsing
4. Start kier boiling at 45° C., 30 minutes at 110° C.,
   $Na_3PO_4$ 8 g/l,
   Securon 540 surfactant 1.5 g/l,
5. Drain and warm-rinse 2x at 50° C.,
6. Drain and cold-rinse 2x at 18° C.,
2. Drain and squeeze,
3. Dry on screen belt dryer at 130° C. to 14% residual moisture Fibre strength elastic modulus 12602 N/mm²

The invention claimed is:
1. Method for the production of a high-strength fibrous material said method consisting of the steps of:
   solubilizing a natural fibre material in an alkaline manner, wherein the natural fibre material is treated with an alkaline material, without being subjected to mechanical stress
   a) for 10 minutes to 3 hours at a temperature of between 5 and 30° C. and then b) for 20 minutes to 1.5 hours at a temperature of between 80 and 150° C., the pH during the treatment according to a) and b) being in the range of from 8 to 14, and is then optionally washed and/or dried, optionally bleaching the fibre material, wherein the produced fibrous material has an average strength (elastic modulus), measured according to DIN EN ISO 5079 in N/mm$^2$, of 8 000 to 60 000 N/mm$^2$, wherein optional bleaching also takes place in a) and/or b), and wherein optionally during the treatment in a) and/or b), complexers, sequestering agents' surfactants and/or foam suppressors are additionally used.

2. Method according to claim 1, wherein the natural fibre material is selected from a) seed fibres, b) bast fibres, c) hard fibres, d) coir, and e) grasses.

3. Method according to claim 1, wherein the natural fibres are selected from cellulose fibres and bast fibres.

4. Method according to claim 1, wherein the alkaline material is selected from alkali metal hydroxide, alkali metal carbonate, and alkali metal phosphates.

5. Method according to claim 1, wherein the pH during the treatment according to a) and b) is in the range from 10 to 14.

6. Method according to claim 1, wherein the pH during the treatment according to a) and b) is in the range from 11 to 12.

7. Method according to claim 1, wherein the concentration of alkaline material in a) and/or b), based on the active ingredient, is in the range from 5 to 15 g/l.

8. Method according to claim 1, wherein the concentration of alkaline material in a) and/or b), based on the active ingredient, is in the range from 7 to 13 g/l.

9. Method according to claim 1, wherein the concentration of alkaline material in a) and/or b), based on the active ingredient, is in the range from 8 to 12 g/l.

10. Method according to claim 1, wherein the concentration of alkaline material in a) and/or b), based on the active ingredient, is 10 g/l.

11. Method according to claim 1, wherein the natural fibre material is treated for 15 minutes to 2 hours according to a).

12. Method according to claim 1, wherein the natural fibre material is treated for 30 minutes to 1 hour according to a).

13. Method according to claim 1, wherein the natural fibre material is treated for in 30 minutes to 1 hour according to b).

14. Method according to claim 1, wherein the natural fibre material is treated for 45 minutes to 1 hour according to b).

15. Method according to claim 1, wherein the temperature in treatment step a) is between 10 and 30° C.

16. Method according to claim 1, wherein the temperature in treatment step a) is between 10 and 25° C.

17. Method according to claim 1, wherein the temperature in treatment step a) is between 15 and 25° C.

18. Method according to claim 1, wherein the temperature in treatment step a) is between 15 and 20° C.

19. Method according to claim 1, wherein the temperature in treatment step b) is between 80 and 140° C.

20. Method according to claim 1, wherein the temperature in treatment step b) is between 85 and 140° C.

21. Method according to claim 1, wherein the temperature in treatment step b) is between 90 and 135° C.

22. Method according to claim 1, wherein the temperature in treatment step b) is between 100 and 135° C.

23. Method according to claim 1, wherein bleaching also takes place in a) and/or b).

24. Method according to claim 1, wherein $H_2O_2$, chlorine or ozone is used as bleaching agent.

25. Method according to claim 1, wherein the natural fibres are used in flock, combed top, nonwoven, yarn or woven fabric form.

26. Method according to claim 1, wherein during the treatment in a) and/or b), complexers, sequestering agents and/or surfactants and/or foam suppressors are additionally used.

27. Method according to claim 3, wherein the seed fibres are selected from the group consisting of linters, cotton, kapok and poplar down.

28. Method according to claim 3, wherein the bast fibres are selected from the group consisting of sclerenchyma fibres, bamboo fibres, (stinging) nettles, hemp, jute, linen, flax, and ramie.

29. Method according to claim 3, wherein the hard fibres are selected from the group consisting of sisal, kenaf and manila.

30. Method according to claim 3, wherein the natural fibres are cellulose fibres selected from the group consisting of linters and cotton.

31. Method according to claim 3, wherein the natural fibres selected from the group consisting of flax, linen, hemp, nettles, ramie, kenaf or jute.

32. Method according to claim 3, wherein the natural fibres selected from the group consisting of flax, linen or hemp.

33. Method according to claim 4, wherein the alkaline material is selected from the group consisting of sodium hydroxide, potassium hydroxide, sodium carbonate, potassium carbonate, trisodium phosphate, and tripotassium phosphate.

34. Method according to claim 4, wherein the alkaline material is selected from the group consisting of sodium hydroxide and trisodium phosphate.

* * * * *